United States Patent
Richter

(10) Patent No.: US 6,888,491 B2
(45) Date of Patent: May 3, 2005

(54) PULSE-RADAR METHOD AND PULSE-RADAR SENSOR AND SYSTEM

(75) Inventor: Karl-Heinz Richter, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/433,350

(22) PCT Filed: Oct. 13, 2001

(86) PCT No.: PCT/DE01/03932

§ 371 (c)(1), (2), (4) Date: Nov. 5, 2003

(87) PCT Pub. No.: WO02/44750

PCT Pub. Date: Jun. 6, 2002

(65) Prior Publication Data

US 2004/0066323 A1 Apr. 8, 2004

(30) Foreign Application Priority Data

Dec. 1, 2000 (DE) .......................... 100 59 673

(51) Int. Cl.⁷ .............................................. G01S 13/93
(52) U.S. Cl. ............................ 342/70; 342/82; 342/59; 342/159; 342/129
(58) Field of Search ................... 342/70–72, 59, 342/82–85, 89, 90, 94, 95, 102, 128, 129, 134, 135, 137, 159, 162, 195, 198

(56) References Cited

U.S. PATENT DOCUMENTS

| | | | | |
|---|---|---|---|---|
| 2,871,346 A | * | 1/1959 | Mercer | 327/25 |
| 3,497,815 A | * | 2/1970 | Turner | 327/25 |
| 3,801,979 A | * | 4/1974 | Chisholm | 342/31 |
| 3,815,133 A | * | 6/1974 | Yasusaka et al. | 342/104 |
| 4,370,652 A | * | 1/1983 | Lucchi | 342/101 |
| 4,709,236 A | * | 11/1987 | Taylor, Jr. | 342/101 |
| 5,017,921 A | * | 5/1991 | McGill et al. | 342/18 |
| 5,828,333 A | * | 10/1998 | Richardson et al. | 342/70 |
| 2004/0066323 A1 | * | 4/2004 | Richter | 342/70 |

FOREIGN PATENT DOCUMENTS

| | | | | |
|---|---|---|---|---|
| DE | 44 12 770 | | 10/1995 | |
| DE | 196 31 590 | | 2/1998 | |
| GB | 2085251 A | * | 4/1982 | ............ G01S/7/28 |
| JP | 59187279 A | * | 10/1984 | ............ G01S/13/76 |
| JP | 61133885 A | * | 6/1986 | ............ G01S/13/22 |

* cited by examiner

Primary Examiner—John B. Sotomayor
(74) Attorney, Agent, or Firm—Kenyon & Kenyon

(57) ABSTRACT

In a pulse-radar method, in particular for motor vehicles, different time slots of a time frame are predefined. During one time slot, a radar sensor emits at least one radar pulse and receives the echo signal(s). During the remaining time slots the radar sensor monitors whether interference signals occur. On the basis of the interference signals occurring per time slot, a decision is made whether the radar sensor should continue its transmitting and receiving operation in the predefined time slot or should switch to one of the remaining time slots of the time frame. The method is suited for the concurrent operation of a plurality of radar sensors, without this causing interference.

17 Claims, 3 Drawing Sheets

PULSE-RADAR METHOD AND PULSE-RADAR SENSOR AND SYSTEM

FIELD OF THE INVENTION

The present invention is directed to a pulse-radar method, in particular for motor vehicles, in which occurring interference signals are monitored.

BACKGROUND INFORMATION

German Patent Application No. DE 196 31 590 describes a radar system that works according to a pulse-radar method. In the FMCW-radar method described, individual time periods are defined in which the oscillator emits modulated high-frequency signals. During at least one time period, no signals used for measuring radar targets are emitted. The interference signals occurring there are recorded and evaluated, together with recorded radar signals, so as to be able to classify them as possible wrong targets.

SUMMARY

In accordance with example embodiments of the present invention, it may be possible to avoid, or at least reduce, mutual interference of pulse-radar systems (short-range radar SRR), in particular when their detection ranges overlap and/or are directed toward each other. This is decisive mainly in the case of surroundings sensor systems of motor vehicles where substantially identical sensors emit radiation towards each other. This happens especially in systems such as park pilot systems (PPS) and dead-angle detection (DAD), since in these cases the detection ranges of the radar sensors may be directed toward each other when motor vehicles approach or pass each other. The cause of this interference is the high bandwidth of the SRR radar pulses. This broadband width is basically required in order to ensure a high-sensitivity resolution of the radar sensors. According to an example embodiment of the present invention, mutual interference in the pulse radar may be prevented by operating the individual radar sensors in time-staggered time slots of a time frame. For this purpose, two measuring functions of a radar sensor are defined. During one predefined time slot, a radar sensor emits at least one radar pulse and receives the echo signal(s). This measuring function is used for the actual obstacle detection. The second measuring function is used to detect interference, i.e., during the remaining time slots of the time frame, the radar sensor monitors the electromagnetic surrounding field. On the basis of the interference signals occurring (per time slot, it is monitored whether a respective time slot is free of interference. Then, a decision is made whether the radar sensor should continue its transmitting and receiving operation in this time slot or should switch to one of the remaining time slots of the time frame.

These measures make the pulse-radar method (SRR) effectively usable in short-range sensing in the first place, in particular for PPS and DAD. Without applying the measures according to the present invention, mutual interference would occur continually once a certain equipment level of motor vehicles had been reached.

The present invention, when compared to conventional systems, provides a diverging control of already existing components on the basis of evaluated signals. Therefore, the measures according to the present invention may easily be retrofitted in already existing systems, for instance by changing the software.

Due to the time restriction of the radar sensor emission, the average interference emission is reduced, thereby lessening the electromagnetic environmental impact.

An averaging of measured values, such as required, for instance, in a pseudo-randomized encoding of trigger pulses and necessitating corresponding additional expense, may be dispensed with.

In one embodiment, in order to decide whether interference is occurring in a redefined time slot, it may be advantageous to consider the number of pulses currently occurring in this time slot as well as their fluctuations.

For the decision whether interference is occurring in at least one of the remaining time slots, it may be advantageous, to take the instantaneous amplitude values in the particular time slot into account and to determine whether they exceed a predefined threshold.

After finding a time slot having little or no interference, it may be advantageous, if the radar sensor begins its transmitting and receiving operation in the next time frame, in the particular time slot that occupies the same time position within the time frame.

It may be advantageous if radar sensors that are at risk for mutual interference, agree to a uniform time frame with corresponding time-slot division.

Features of the present invention may contribute to making it possible for a plurality of radar sensors to operate next to each other without interference.

It may be advantageous if a radar sensor and, if appropriate, additional radar sensors, discard(s) its (their) measurements if interference occurs in the particular time slot(s) used in each case for the transmitting and receiving operation. This results in reliable measurements.

According to one refinement of the present invention, radar sensors search for time slots having little or no interference according to the random principle and keep on using such time slots until interference occurs there.

According to another refinement, radar sensors belonging to a common system or motor vehicle, in particular when arranged in close proximity, are advantageously precontrolled in such a way that they occupy different time slots within the time frame. A painstaking search for time slots without interference will then be unnecessary.

In one embodiment, heavy external interference occurs in such radar sensors, they reroute only temporarily to time slots having less or no interference and resume their precontrolled operation once the external interference has lessened.

According to another refinement of the present invention, it may be advantageous that a different polarization is used for reducing interference of simultaneously active radar sensors.

According to another advantageous refinement of a pulse-radar sensor, in particular for implementing the method according to the present invention, a simple switching of a time slot may be possible for emitting or receiving the radar pulses. This may require only a redirecting as a function of an evaluated signal.

In another, refinement of the present invention, radar pulses may be evaluated for interference in a simple manner.

In another refinement, interference in the remaining time slots may be detected by simple means.

Other refinements may effectively reduce mutual interference of radar sensors. In particular, the simultaneous use of different time slots for different radar sensors and the use of different polarizations results in substantial interference immunity within a system.

BRIEF DESCRIPTION OF THE DRAWINGS

Exemplary embodiments of the present invention are explained in greater detail on the basis of the drawings.

DESCRIPTION OF EXAMPLE EMBODIMENTS

Figure 1:
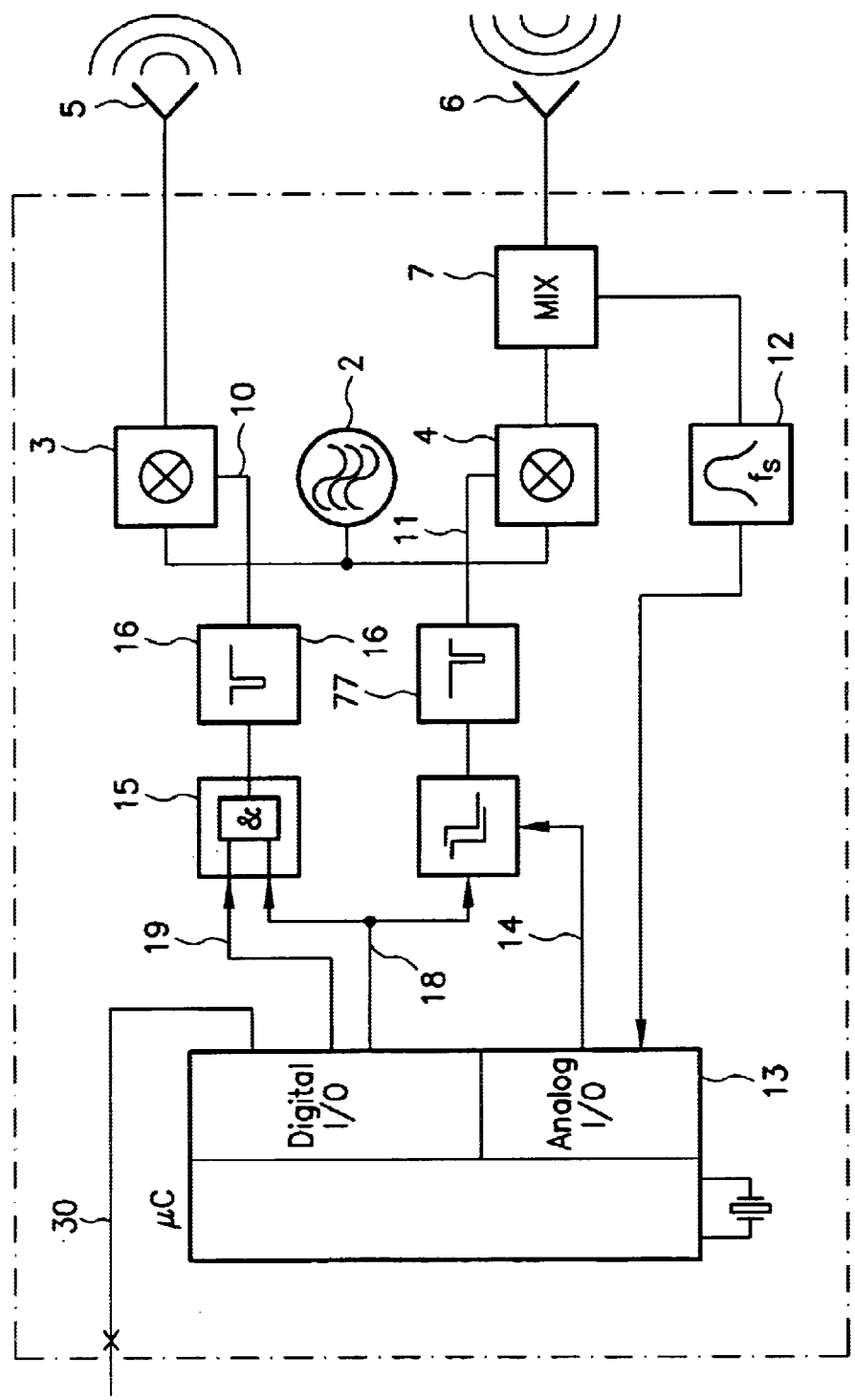
FIG. 1 shows a basic construction of a radar sensor for implementing the method according to an example embodiment of the present invention.

As shown in FIG. 1, a microwave-carrier oscillator 2 in radar sensor 1 generates a carrier frequency. With the aid of trigger-pulse-controlled fast switches 3 and 4, in particular diode switches, oscillation packets are formed from the continuous signal of carrier oscillator 2. Via an antenna 5, the oscillation packet formed via switch 3 is emitted. After reflection at a possible obstacle, parts of this signal are picked up by receiving antenna 6 and conveyed to a mixer 7. This mixer 7 mixes the oscillation packet formed via switch 4 with the incoming signal. Mixer 7 provides an output signal 8 if the received and the sampling signal (via switch 4) coincide in time. With the aid of a controllable pulse delay 9, the sampling pulse is delayed with respect to the transmission pulse, due to the fact that trigger pulse 11 for switch 4 is conveyed via pulse delay 9, whereas trigger pulse 10 reaches switch 3 without a delay. The control of pulse delay 9 is implemented by a control voltage 14. The magnitude of the delay is determined by the known correlation of both variables. Output signal 8 of mixer 7 is forwarded to a control unit 13 via a band-pass amplifier 12. Control unit 13 evaluates this echo signal.

The delay time at which mixer 7 provides an output signal (echo signal) is then equal to the runtime of the waves between radar sensor 1 and the obstacle. The distance from the obstacle is determined from the known propagation speed of the electromagnetic waves and the measured time.

Control unit 13, which may be a microprocessor, provides trigger pulses 18, which, after appropriate conditioning, are conveyed to switches 3 and 4 as their trigger signals 10 and 11, respectively. On the one hand, trigger pulses 18 are conveyed to switch 3 via a pulse gate 15 and a pulse shaper 16 and, on the other hand, to switch 4 via pulse delay 9 and pulse shaper 17.

Figure 2:
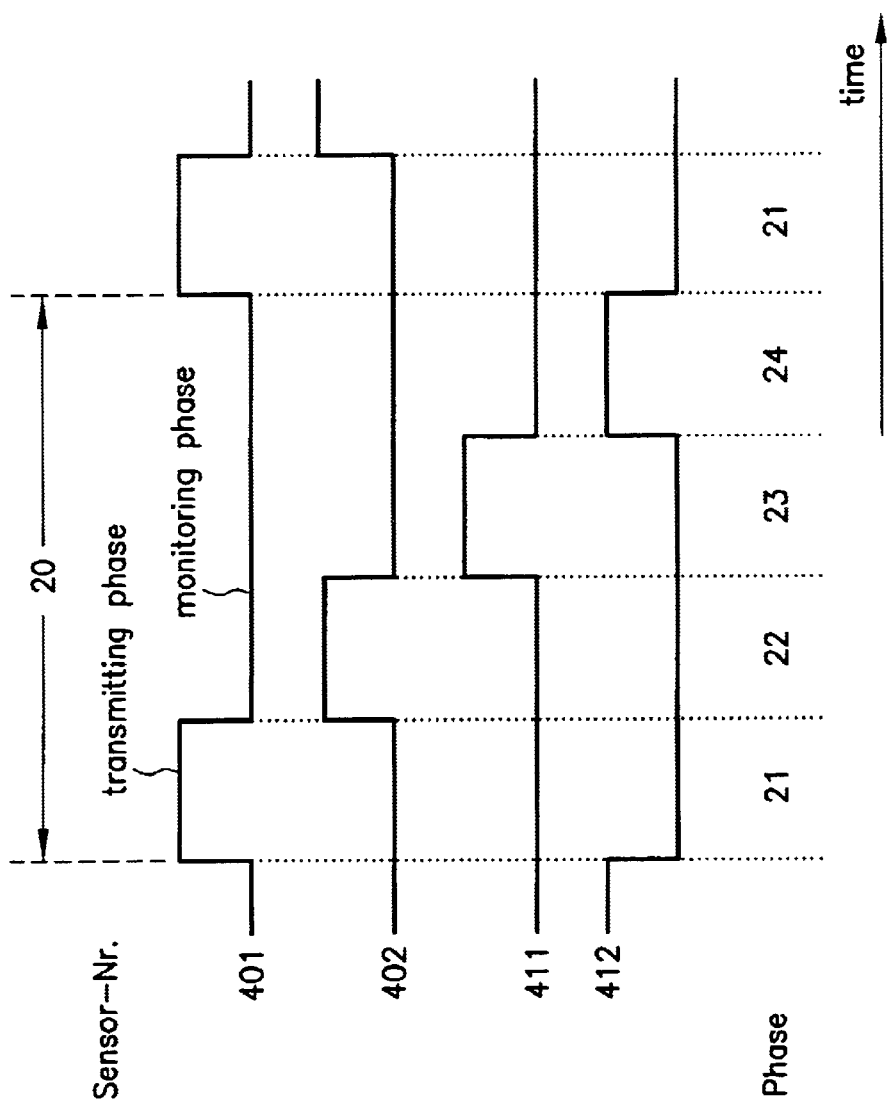
FIG. 2 shows the staggered utilization of time slots by different radar sensors.

To transmit the oscillation packets, i.e., the radar pulses, a time frame 20 is predefined according to FIG. 2, which in the exemplary embodiment shown is divided into time slots 21, 22, 23, 24. After first time frame 20 has elapsed, another time frame begins again with time slot 21. Time frame 20 specifies the cycle time of the measurements. The measuring phase, i.e., the time during which a radar sensor emits radar pulses and evaluates their echoes, corresponds to one of these time slots, such as time slot 21. The monitoring phase, i.e., the time of the remaining time slots 22, 23, 24 within time frame 20, is used to monitor interference, which is caused in particular by other radar sensors. Such monitoring allows one or a plurality of other radar sensors to conduct their measurements without interference. In FIG. 2, one measuring phase (time slot) and three monitoring phases (remaining time slots) were assumed for each radar sensor by way of example. In this way, four different radar sensors 401, 402 and 411 and 412 may be operated in an interference-free manner. Their measuring phases, as indicated in FIG. 2, occupy different time slots 21, . . . , 24. Of course, any number of whole-number ratios of monitoring and measuring phases is possible. This subdivision, for one, is restricted by a lower limit for the measuring rate, i.e., the shortening of the measuring rate must technically still be tolerable so as to provide reliable results, and, for the other, is restricted by the length of a time frame, i.e., the repetition of measurements must be adapted to the requirements (the higher the possible absolute speed of a motor vehicle, and the higher the relative speed variation, the shorter a time frame 20 must be).

The setpoint selection of time frame 20 and of time slots 21, . . . 24 is specified by control unit 13 by the repeat frequency of trigger pulses 18, and/or by pulse gate 15. Using pulse gate 15, which is realized by an AND-circuit, for example, to which the control unit conveys gate signals 19 in addition to trigger pulses 18, the trigger pulses may be transmitted further or suppressed and the measuring phase thereby switched off or on—suppression or emission of the radar pulses. Pulse gate 15 may also be an integral component of control unit 13, or be realized within the microprocessor by internal signal linkage. Each radar sensor is designed such that interference is able to be detected. For this purpose, the sampling function of the radar sensor is in operation at all times (triggering of switch 9 in all time slots).

If a plurality of radar sensors cooperate in one system, it is possible to transmit an interface signal 30 to control unit 13 in order to ensure that the radar sensors of this system all have their measuring phases in different time slots and do not interfere with each other.

The interference by other radar sensors manifests itself by pulses whose distribution in time is random.

In the monitoring phase, mixer output signal 8 is monitored with respect to amplitudes that exceed a certain threshold. If these happen at a certain occurrence rate, it is assumed that another radar sensor is transmitting in this phase. The monitoring radar sensor will then avoid this range as measuring phase.

In the measuring phase, echo and interference pulses occur simultaneously. If the number of pulses is approximately constant, it may be assumed that no interference signals are present. If the number of pulses fluctuates and is high, then it is highly likely that interference pulses are present. The measurement must then be discarded and restarted after an agreed-upon interval.

It is advantageous if all pulse-radar systems observe a uniform measuring cycle. If the interference signal is detected in a measuring cycle and if the interference regions are determined, then it can be predicted which time slots must not be used by the involved radar sensors. The monitoring radar sensor may synchronize to a vacant time slot in the next measuring cycle, such as time slot 21, and retain this slot during the further measurements.

If two or a plurality of radar sensors are transmitting simultaneously and the interference is such that at least one radar sensor encounters interference, the measurement is discarded. This requires a threshold-decision element for ascertaining whether interference is present in the remaining time slots of the time frame. If a plurality of radar sensors encounters interference, the measurement is discarded in both radar sensors.

Through monitoring, the radar sensors will ascertain free time slots once again. In order to avoid that the next free time slot is used again by a plurality of radar sensors, the sensors begin transmitting in a free time slot according to the random principle.

Since it cannot be excluded with the complete certainty under the random principle that a plurality of radar sensors is transmitting nevertheless, the current measurement is discarded in the event of new interference and a free time slot is searched for again on the basis of the mentioned principle.

The control of the measuring and monitoring function of the radar sensors may be carried out in a central control device or in the radar sensor itself. In the latter case, a processor (control device 13) in the radar sensor is required for this purpose.

In order to minimize the interference in the radar sensors in a motor vehicle from the outset, adjacently located sensors may be triggered (precontrolled) by a common control device in such a way that they use different time slots. Control device 13 of the radar sensors is able to be appropriately controlled by this common control device via interface signal 30. Only in the event of heavy external interference will they automatically deviate to time slots having less interference. After the interference has disappeared, the radar sensors reoccupy their original time slots. The change is possible because the mutual interference of adjacently located radar sensors in a safety bumper, for instance, is less than interference coming from radar sensors in another vehicle whose radar sensors are pointing directly at each other, cf. FIG. 3.

In various radar sensors that are at risk for interference, it is advantageous to use antennas having differing polarization, in particular antennas having 45° polarization, for mutual decoupling. In this method, it is presupposed that no effective polarization rotation occurs by the installation of the sensors behind the safety bumpers or other moldings. The rotation of the polarization would reduce the suppression again. The simultaneous application of the time-slot method and of the 45° polarization results in a very high interference immunity of the system.

Figure 3:
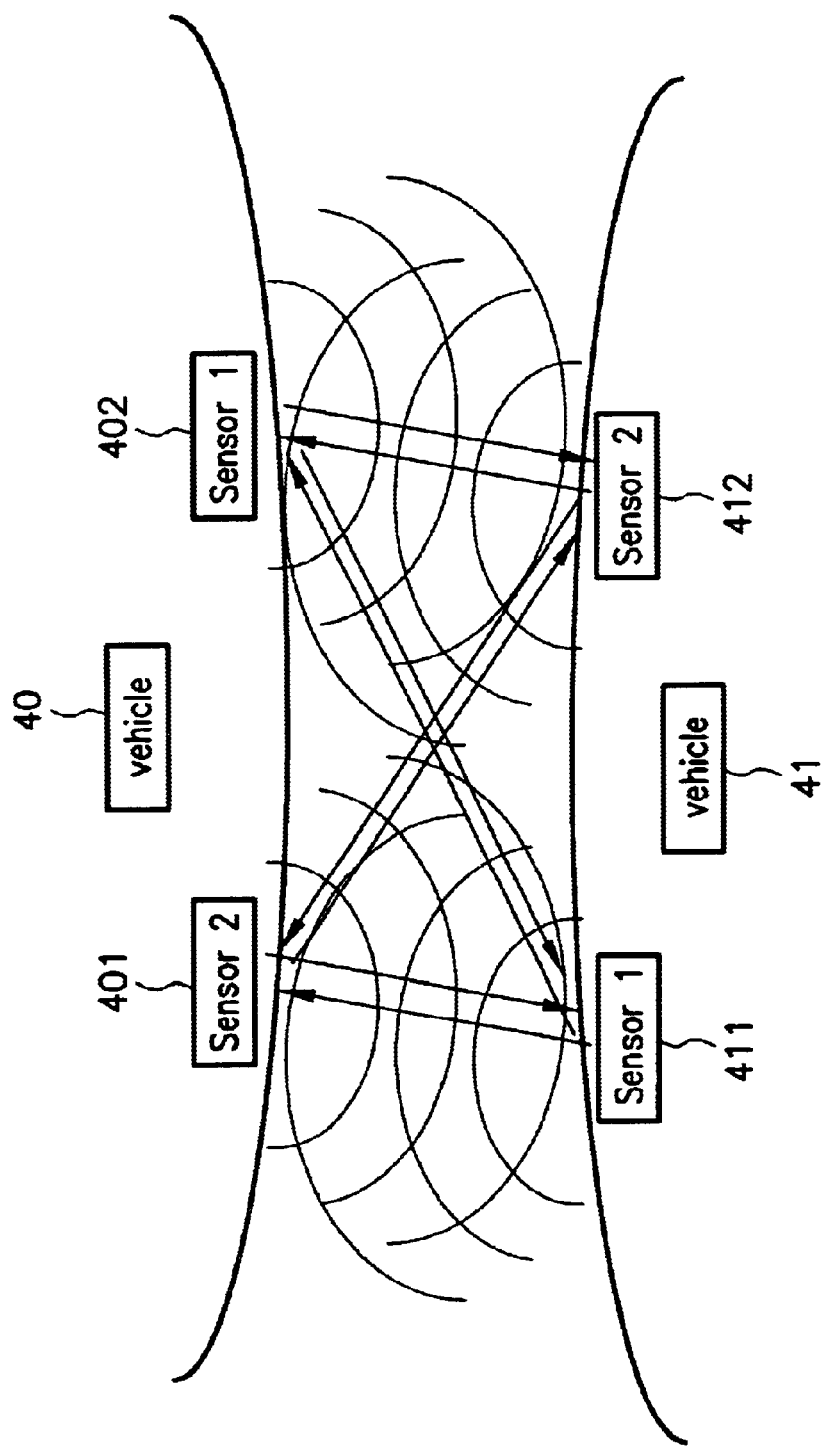
FIG. 3 shows the mutual interference influencing by radar sensors of two motor vehicles.

FIG. 3 schematically shows the interference influence in two vehicles 40 and 41 each having two sensors 401 and 402 and 411 and 412, respectively.

So that substantially identical products from other manufacturers are compatible with the method according to the present invention, it may be advantageous if all radar sensors for which the likelihood of mutual interference is very high use the same time frame 20 with the same time-slot division.

What is claimed is:

1. A pulse-radar method for motor vehicles, comprising:
   emitting by a radar sensor at least one radar pulse, and receiving by the radar sensor an echo signal during a predefined time slot of a time frame;
   monitoring, by the radar sensor during remaining time slots of the time frame, whether interference signals occur;
   determining whether the radar sensor should continue the transmitting and receiving operation in the predefined time slot or should switch to one of the remaining time slots of the time frame on the basis of the interference signals occurring per time slot; and
   after finding a time slot having little or no interference, beginning, by the radar sensor, a transmitting and receiving operation in a next time frame in a particular time slot that has a same time position within the next time frame as the time slot having little or no interference, and retaining the particular time slot for further measurements within a measuring cycle.

2. The method as recited in claim 1, further comprising: monitoring whether interference signals occur during the predefined time slot including taking into account the number of the instantaneously occurring pulses in the predefined time slot and fluctuations in the number.

3. The method as recited in claim 1, wherein the determining step includes taking into account instantaneous amplitude values in the particular time slot that exceed a predefined threshold.

4. The method as recited in claim 1, wherein radar sensors that are at risk of causing mutual interference perform according to a uniform time frame with corresponding time-slot division.

5. The method as recited in claim 1, further comprising: discarding measurements by the radar sensor if interference occurs in the particular time slot used for the transmitting and receiving operation.

6. The method as recited in claim 1, further comprising: searching by the radar sensor for time slots having little or no interference according to the random principle; and retaining a found time slot having little or no interference until interference occurs in the found time slot.

7. The method as recited in claim 1, further comprising: arranging radar sensors belonging to a common system adjacent to each other; and
   precontrolling the radar sensors with respect to their time slots for the transmitting and receiving operation in such a way that they occupy different time slots within a time frame.

8. The method as recited in claim 1, further comprising: arranging radar sensors belonging to a motor vehicle adjacent to each other; and
   precontrolling the radar sensors with respect to their time slots for the transmitting and receiving operation in such a way that they occupy different time slots within a time frame.

9. The method as recited in claim 7, wherein the precontrolled radar sensors reroute only temporarily in the event of heavy external interference to time slots having little or no interference, and resume their precontrolled operation once the external interference has lessened.

10. The method as recited in claim 7, wherein the radar sensors use a different polarization.

11. The method according to claim 10, wherein the polarizations differ by 45°.

12. A pulse-radar sensor for motor vehicles, comprising:
    an arrangement for generating a carrier-frequency signal;
    an arrangement for deriving radar pulses from the carrier-frequency signal;
    an arrangement for selecting a predetermined time slot within a setpoint of time slots within a time frame for the emitting and receiving of the radar pulses;
    an arrangement for emitting the radar pulses and receiving radar pulses in the predetermined time slot;
    an arrangement for evaluating transmitted radar pulses for occurring interference in the predetermined time slot, the arrangement for evaluating including an arrangement for monitoring during remaining time slots of the time frame, whether interference signals occur; and
    an arrangement for changing to one of the remaining time slots for the transmitting and receiving of the radar pulses as a function of at least one signal emitted by the arrangement for evaluating the transmitted radar pulses.

13. The pulse-radar sensor as recited in claim 12, wherein the arrangement for evaluating transmitted radar pulses is configured to count radar pulses instantaneously occurring in the time slot, and is configured to record a fluctuation.

14. The pulse-radar sensor as recited in claim 12, further comprising:
a threshold-decision element configured to detect whether interference is present in remaining time slots of the time frame.

15. A system, comprising:
at least two pulse-radar sensors, each of the sensors including:
an arrangement for generating a carrier-frequency signal;
an arrangement for deriving radar pulses from the carrier-frequency signal;
an arrangement for selecting a predetermined time slot within a setpoint of time slots within a time frame for the emitting and receiving of the radar pulses;
an arrangement for emitting the radar pulses and receiving radar pulses in the predetermined time slot;
an arrangement for evaluating transmitted radar pulses for occurring interference in the predetermined time slot, the arrangement for evaluating including an arrangement for monitoring during remaining time slots of the time frame, whether interference signals occur; and
an arrangement for changing to one of the remaining time slots for the transmitting and receiving of the radar pulses as a function of at least one signal emitted by the arrangement for evaluating the transmitted radar pulses;
wherein the radar sensors have a uniform time frame and a common control device, and each of the radar sensors being preconfigured to occupy a different time slot within the time frame.

16. The system as recited in claim 15, further comprising:
an arrangement for deviating from the preconfigured time slot in the event of temporary, heavy external interference.

17. The system as recited in claim 15, wherein each of the radar sensors has a different polarization.

* * * * *